Patented Aug. 31, 1926.

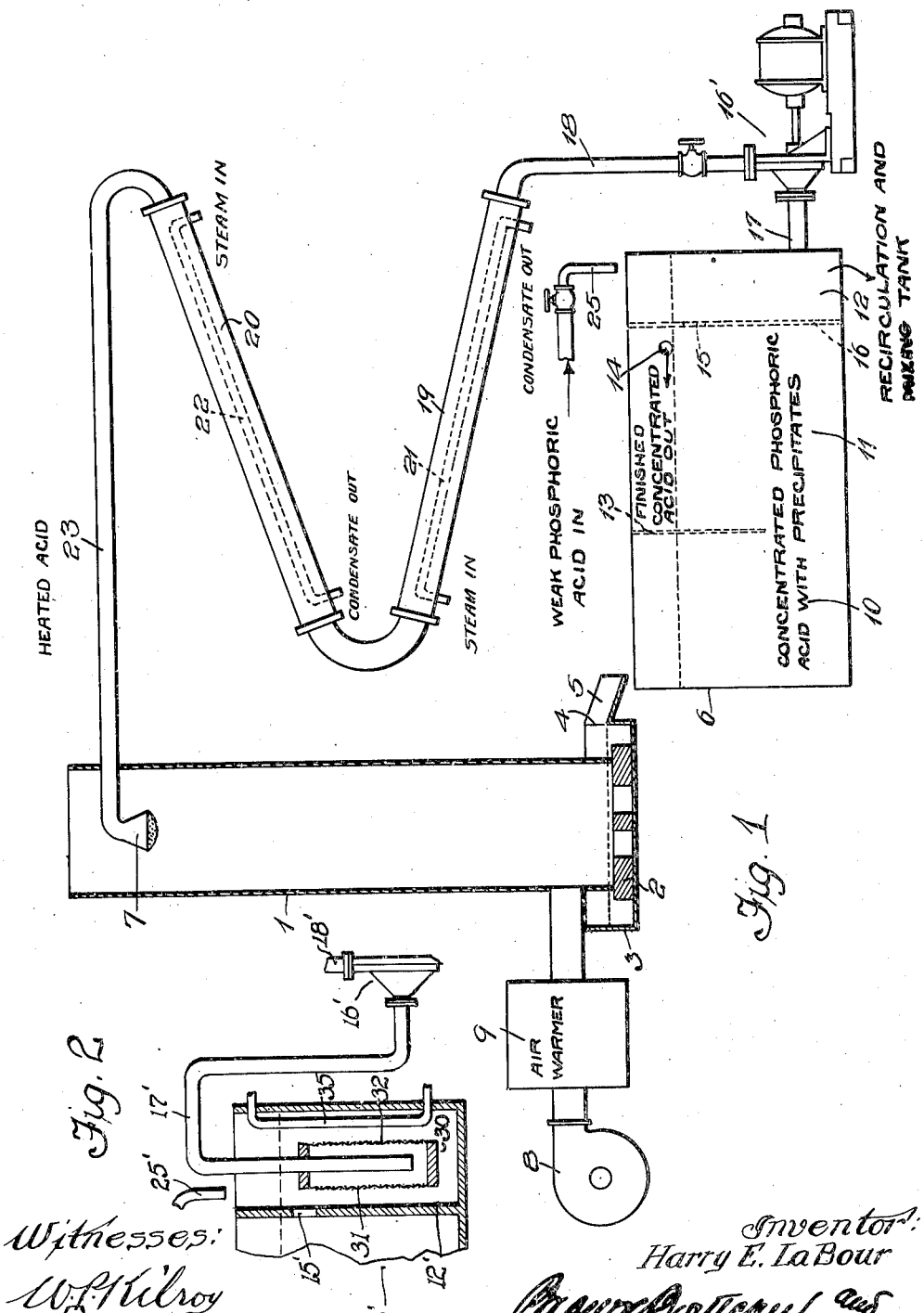

1,597,984

UNITED STATES PATENT OFFICE.

HARRY E. LA BOUR, OF HOMEWOOD, ILLINOIS.

METHOD OF CONCENTRATING AND PURIFICATION OF PHOSPHORIC ACID.

Application filed September 13, 1923. Serial No. 662,383.

My invention relates to a method of and means for concentrating and purifying liquids and although it is particularly adapted for and will be described in connection with concentrating and purifying phosphoric acid, it is to be understood that the method of my invention is not limited to such use, but may be used for concentrating and purifying any liquid containing a free scaling precipitate.

Where phosphoric acid of a purity suitable for food purposes is to be derived from phosphate rock the crude phosphoric acid obtained by the acidulation of the rock with sulphuric acid contains a number of impurities which must be removed or greatly reduced in volume. The usual impurities which are encountered are some form of arsenic, lead, iron, alumina, fluorine, calcium, and organic matter.

In the commercial manufacture of this acid a well established practice for the removal of these impurities has been developed. The removal of such impurities as iron, alumina, fluorine and organic matter is complicated and very expensive. The resulting acid is weak and must be concentrated and the item of concentration involves further difficulty and expense. Different manufacturers vary the sequence and details of the purification procedure to some extent, but the common practice provides for the following steps.

The rock is leached with sulphuric acid reinforced with weak phosphoric acid and a crude phosphoric acid is obtained after filtration. This resulting crude acid is of intermediate strength and it carries impurities which must be removed. As a practical matter and lastly for the purpose of controlling the scale formation the resultant acid usually carries an excess of free sulphuric acid.

The crude acid is then treated to remove arsenic and is again filtered.

In order to remove to the desired extent the iron and alumina and a certain percentage of the fluorine, the acid is treated while warm with a considerable amount of lime. This precipitates the iron and alumina as phosphates and the precipitate is removed by filtration. The resultant liquor is a calcium phosphate which is weak and which cannot be safely concentrated in this form. Consequently it is treated with an excess of sulphuric acid which throws out the lime as calcium sulphate and gives a very weak phosphoric acid still containing an excess of fluorine, organic matter, and lead, as well as an excess of lime. This acid may be safely concentrated and passes to the evaporator.

As heretofore practiced during concentration by special treatment sufficient of the remainder of the fluorine is removed, the excess lead is precipitated, and the organic matter is burned out. This process is highly inefficient. The efficiency of evaporation seldom exceeds 30 percent. Furthermore the acid is so weak that a tremendous amount of water must be removed. There is also a heavy scale formation which is expensive to handle and which reduces the evaporating efficiency.

Attempts have been made to concentrate the crude acid direct from the original leach but the mechanical difficulties from scale formation and corrosion as well as high chemical loss in the ordinary types of evaporators have made the concentration of this liquor heretofore a practical impossibility.

According to my invention I purify and concentrate the crude phosphoric acid by mechanical and thermal treatment as distinguished from carrying it through chemical stages to precipitate the bulk of the impurities. According to my invention I produce a crude acid higher in lime than is common practice where liquid phosphoric acid is to be produced. The excess lime assists in the precipitation during concentration of a large amount of the fluorine as calcium fluoride and also assists in the precipitation of iron and alumina salts.

The crude acid passes through the low temperature evaporator where the liquid is kept in violent motion in contact with a large volume of warm air, for a long period. I shall describe in the following detailed specification and illustrate in the drawings a type of evaporator which is suitable for this purpose. The scale forming impurities having no heated surface to adhere to during concentration come down as a sludge which is mostly calcium sulphate, calcium fluoride and iron and alumina salts. It is to be remembered that these impurities are driven out by concentration and no other material such as lime or sulphuric acid need be added. A large amount of fluorine is also carried out with the water vapor. The acid which comes from the evaporator contains the organic matter, lead and a slight excess of fluorine, which must be removed or reduced by further treatment. By treating the acid with decolorizing carbon the organic matter and some of the metallic salt are absorbed. This clearing up of organic matter may also be accomplished by introducing into the evaporator some oxidizing agent such as chlorine gas.

To remove arsenic, lead and additional fluorine the liquid is treated with a gas such as hydrogen sulphide and is again filtered to remove the precipitate. The introduction of decolorizing carbon, chlorine gas, and hydrogen sulphide serves to clear the liquid and precipitate out of it the impurities which remain after the bulk of such impurities has been removed by the mechanical and thermal treatment of the crude phosphoric acid.

The exact sequence of the operation may be varied somewhat. For instance the treatment with hydrogen sulphide gas may be performed before evaporation. I have preferably placed it as the final step because it assists in the removal of some fluorine and takes out the excess lead.

It will be noted that at no point in the operation is water added to the acid, nor in fact is any matter amounting to a relatively large bulk added which must again be removed. Because of this the saving in cost of materials as well as the saving in power for evaporating excess water is of the order of 50 percent. The improved type of evaporator gives a high evaporating efficiency as high as 70 percent. The volume of residues to be handled and the amount of filtering to be done is also enormously reduced.

In order to acquaint those skilled in the art with the particular method of practicing my invention and in order to illustrate apparatus suitable for performing the necessary steps I shall now describe, in connection with the accompanying drawings, a particular embodiment of my invention.

The particular principle upon which I proceed in purifying and concentrating the crude phosphoric acid is the following:

In the concentration of crude phosphoric acid, as the strength increases, there comes a time when the contained impurities which will precipitate reach super-saturation and are forced out of solution, any lowering of temperature also tends to increase the precipitation from a saturated solution. Inversely an increase in temperature tends to stop precipitation. If evaporation takes place out of contact with heated surfaces the impurities come down as fine precipitate, that is a sludge, and do not readily harden into scale. By proper handling it thus becomes possible to heat such a liquid without boiling and without the consequent scale formation. It is also possible to evaporate a crude liquid without overheating which overheating may cause chemical change and consequent loss.

According to my novel process of evaporation I employ a closed circuit on the liquid side and an open circuit on the gas side. Obviously I could maintain a closed circuit on the gas side but it is not economical to do so.

I keep in circulation in the closed circuit, sufficient relatively finished liquid to act as a carrying and distributing medium for the relatively crude liquid. I add, to the mixture of relatively crude and relatively finished liquids that amount of heat necessary to supply the latent heat of vaporization to concentrate the crude liquid to a condition corresponding to the finished liquid. I then remove an amount of finished liquid corresponding to the excess over the initial amount of finished liquid.

In the evaporator the heated mixture of liquids is brought into contact with warm, relatively dry, air, which acts as the moisture carrying medium. I provide means for removing scale formation in the passage of the solution to the heater, and for preventing super-saturation of the solution, and added precipitation in its passage through the settling and mixing compartments.

In the accompanying drawings:—

Figure 1 is a diagram of the evaporator; and;

Fig. 2 is a fragmentary diagram of a modification of the mixing and settling compartments, showing means for removing scale formation from the solution in its passage from the mixing compartment and for heating the liquid at that point to prevent super-saturation and increased precipitation.

The evaporator comprises a contact tower 1 which may be a suitable circular shell extending vertically and resting at its open bottom on supporting block 2 in a shallow pan 3. This pan has a fixed overflow weir 4 over which liquid is discharged through the connection or spout 5 into tank 6. A suitable liquid spray head 7 is mounted in the upper end of the tower and liquid is discharged through this spray head in the form of a spray or rain which drops down through the tower. Suitably conditioned air is blown upwardly through the contact tower 1 by the fan 8 which drives air through the conditioning apparatus 9 and into the base of the tower. The air is warm and dry and the liquid coming from the spray head 7 is warm and is broken up to present an extensive area to the contact with the air with the result that a very considerable evaporation of water takes place, said water being carried off by the air.

The tank 6 is divided into three compartments, 10, 11 and 12, the compartments 10 and 11 communicating at their bottom below the plate or wall 13 which extends down close to the bottom of the tank to induce the precipitate to drop down to the bottom of said tank. A pipe or overflow connection 14 is provided near the top of the tank in the second compartment 11 and this serves to maintain the level in all three of the compartments fixed. The compartments 11 and 12 communicate by way of the opening 15 which is formed in the wall 16 below the normal surface of the liquid and adjacent the draw-off or overflow connection 14. A suitable pump such as a centrifugal pump 16′ has its intake 17 connected with the compartment 12 and the discharge pipe 18 of this pump leads to the heater composed of the inclined section such as 19 and 20 which may be of any number required. These inclined heating sections 19 and 20 have pipes 21 and 22 mounted therein to heat the liquid as it passes through said heating sections. Steam is admitted to the upper ends of said pipes 21 and 22 and the condensate or water of condensation is drained off at the lower end of said pipes. From the upper end of the heating sections 20 the liquid is discharged through a pipe 23 to the spray nozzle 7 in a contact tower 1. Fresh liquid is continually introduced by the feed pipe 25 which may be regulated to discharge the raw liquid at a suitable rate into the compartment 12. The raw liquor enters preferably warm and to this end it may be heated in its passage from the treatment tank to the evaporator. It drops into the compartment 12 where it is mixed with a certain amount of the concentrated acid which is maintained in the compartments 10 and 11. A certain amount of the raw or untreated liquor passes back through the opening 15 and maintains the necessary volume to permit finished liquid to be drawn off at 14. The raw liquid with a certain percentage of concentrated liquid mixed therewith, is drawn out by the pump 16, discharged through the heating sections 19 and 20 and then through the pipe 23 to the spray nozzle 7 where it is sprayed in the contact tower 1. Here it is met by a rising current of air from the blower 8 and air conditioning device 9. The liquid is thereby freed of a very considerable amount of its water and due to the concentration and cooling the liquid arrives at the base of the tower with a considerable formation of sludge which comprises impurities forced out of solution. The resultant material flows over into the tank 6 where the precipitate drops to the bottom of the tank and the excess concentrated liquid flows off at overflow 14, while the greater volume passes through opening 15 into compartment 12 and is mixed with fresh raw liquid and again heated and circulated through the tower. The bottom of the tower 1 is always submerged in the liquid in the pan 3. The heating sections 19 and 20 are so arranged that not only do the heating pipes 21 and 22 drain automatically but also when it is desired to stop the flow of liquid to these sections all liquid will flow back and out of said heating sections.

It is to be noted that most of the heating of the liquid occurs in the closed heater sections 19 and 20 where it is held under some pressure so as to prevent local ebullition and consequent scale formation. All of the evaporation then takes place in the tower and the sludge falls to the bottom with the finished acid. The sludge is carried over with the liquid into the large compartment 10 and 11 where the velocity is greatly reduced to permit the sludge to settle. There is also some cooling in the tank 6 which forces out more of the sludge and thereby insures that there will be no further deposit of precipitate on the heating coils. Most of the liquid is circulated many times before passing off as finished liquid and while being so circulated it is brought intimately in contact with large volumes of warm, dry air which take up a great deal of the moisture and some of the other impurities. Part of the fluorine is driven off as a gas but a large part is precipitated as calcium fluoride. Iron and alumina drop out during concentration and the excess calcium comes out as calcium sulphate.

As previously mentioned the solution is preferably basic in nature to assist in purification and concentration. The evaporation is carried on at a temperature below ebullition. The liquid is retained in the evaporator for a relatively long period of time in contact with the current of warm dry air.

It may be necessary to filter out some of the impurities in the passage of the liquid from the tower 1 through the tank 6 and certain other special treatments may be provided if desired, but the fundamental action by which I bring the acid to the commercial concentration and purity I believe to be broadly new.

In Figure 2 I have shown a filter 30 for filtering out scale formation in the passage of the liquid from tank 6′ to the heating coils by way of pump 16′. Filter 30 is preferably of the suction type as shown, although it may be varied as desired. It is arranged in compartment 12′ and intake 17′ of pump 16′ extends up over the top of compartment 12′ and down into the filter, opening at its lower end between filtering surfaces 31—32 which may be of fine mesh screen, fabric or other suitable material. In the operation of pump 16′ the suction created in the filtering device draws the liquid in through filtering surfaces 31—32 which filter or screen out precipitate, the liquid being drawn from the interior of the filter to pump 16' from where it is delivered to the heating coils through discharge pipe 18'.

The solution discharged from tower 1 to tank 6' by way of spout 25' is saturated. In its passage through tank 6' the temperature of the solution is lowered. To prevent super-saturation and increase in the precipitate from the solution, due to the lowering of temperature, as already explained, which super-saturation with its increased precipitation is particularly undesirable in the passage of the liquid from tank 6' to the heating coils, I provide in Figure 2 a heating pipe or coil 35 for heating the liquid at its point of passage from compartment 12' to pump 16'. The heat added to the liquid at this point is preferably slightly greater than that lost in the passage of the liquid through tank 6', so that its temperature will be slightly greater than at the point where it enters tank 6'. Super-saturation with its increased precipitation in the passage of the liquid from tank 6' to pump 16' and on to the heating coils is thereby avoided.

I do not intend to be limited to the precise details shown and described, nor to treatment of a particular liquid. As already pointed out the treatment of any liquid carrying a free scaling precipitate, is contemplated, as are various modifications. For example the number of compartments in tank 6 and the form and arrangement of the tank and other apparatus may be varied.

The principles of this invention may be applied to the separation of water out of an aqueous solution or the selective separation of liquids in solution.

I claim:—

1. The method of purification and final concentration of a liquid carrying a free scaling prepicitate which comprises evaporating water from said liquid at a temperature below ebullition out of contact with a heating surface to simultaneously concentrate and cool the liquid.

2. The method of purification and final concentration of a liquid carrying a free scaling precipitate which comprises heating the liquid in a closed container to a point below ebullition, spraying the heated liquid into contact with a blast of warm air to evaporate water from said liquid at a temperature below ebullition and to cool the same and separating out the precipitates thrown down by said concentration and cooling.

3. The method of purifying and concentrating raw dilute phosphoric acid which comprises heating the acid in a closed container to a point below ebullition, spraying the heated liquid into contact with a blast of warm air to evaporate water from said liquid and to cool the same and separating out the precipitates thrown down by said concentration and cooling.

4. The method of purifying and concentrating raw phosphoric acid which comprises spraying the liquid in a contact tower, moving a large volume of air through said tower in contact with the spray, evaporating water from said spray by employing a part of the heat in the liquid for substantially all of the heat of vaporization of the liquid which is evaporated, and collecting the cooled liquid and taking out the precipitate.

5. The method of continuous purification and concentration of raw phosphoric acid which comprises, adding the raw liquid to purified and concentrated acid previously treated, warming the mixture so as to prevent precipitation of impurities and to provide the heat of vaporization for evaporation, spraying the liquid in contact with a blast of air, thereby evaporating and carrying off water from the liquid to concentrate and simultaneously cool the same.

6. The method of continuous purification and concentration of a raw phosphoric acid which comprises circulating the liquid through a closed circuit and at separate points therein performing the following; namely, adding the raw acid to the liquid in the circuit, then warming the liquid to provide the heat for vaporization of a part of the liquid but to bring it to a temperature short of the ebullition point, then bringing the liquid in subdivided form into contact with a current of gas to evaporate below ebullition and carry off water from the acid, then taking out the impurities precipitated and finally withdrawing a portion of the concentrated and purified liquid from the circuit.

7. The method of selectively separating part of a liquid out of solution by evaporation which comprises bringing a carrier gas into contact with the solution out of contact with a heating surface, and taking the heat of vaporization for the vapor out of the solution.

8. The process of manufacturing phosphoric acid which comprises heating a raw liquid solution containing phosphoric acid and other impurities under pressure so as to prevent local ebullition and scale formation, spraying the heated liquid downward as a freely falling spray and in direct contact with an upwardly directed blast of warm air evaporating a portion of the liquid at a temperature below ebullition, carrying off the vapor so formed by the blast of air, collecting the concentrated liquid and precipitating the impurities by the concentration of the solution and the loss of heat, and drawing off part of the liquid which contains the lower percentage of the impurities.

9. The method of concentrating a solution of a free scaling precipitate which comprises adding heat to the solution for the purpose of supplying the latent heat of vaporization of a part of the solvent, then spraying the liquid in a free falling spray and evolving a vapor of the solvent from the liquid out of contact with a heating surface at a temperature below ebullition of the solution.

10. The method of concentrating a solution containing a free scaling precipitate which comprises heating the solution to less than ebullition temperature at substantially no greater than atmospheric pressure for the purpose of supplying the latent heat of vaporization of a part of the solvent, then withdrawing the liquid from contact with a containing surface to prevent the precipitation of scale, and evolving a vapor from the liquid while it is so out of contact to concentrate and cool the same and precipitating the scale forming impurities by said cooling and concentration.

11. The method of treating raw phosphoric acid which comprises spraying the acid in a tower and blowing air and water vapor through the spray and thereby removing fluorine.

12. The method of treating raw phosphoric acid for purification and concentration, which comprises heating the acid to substantially ebullition temperature, spraying the acid in a free falling spray, moving a current of warm air up through the spray, carrying water vapor by said air, and washing the spray with said vapor thereby abstracting fluorine.

13. The method of treating phosphoric acid of relatively low free sulphuric acid content, which comprises heating the acid to provide the latent heat of vaporization for evaporation of a part of the same, spraying the acid at a temperature below ebullition in a freely falling spray, blowing air through the spray to carry away water vapor and some impurities from the acid, and to cool the same, and driving out some of the impurities as a sludge by the concentration and cooling aforesaid.

14. The method of treating phosphoric acid of relatively low free sulphuric acid content, which comprises heating the acid to provide the latent heat of vaporization for evaporation of a part of the same, spraying the acid at a temperature below ebullition into a spray tower, blowing air up through the tower to carry away water vapor from the acid, thereby abstracting fluorine from the acid by contact with the water vapor carried by the air, and driving out some of the impurities as a sludge by the concentration and cooling caused by the aforesaid evaporation.

15. The method of concentrating and purifying raw phosphoric acid having a relatively low free sulphuric acid content, which comprises heating the acid to provide it with the latent heat of vaporization of a part of the water therein, dropping the acid in a free falling spray, evolving water vapor at a temperature below ebullition from the heated liquid as it falls to concentrate and cool the same, and carrying the water vapor upward in contact with the spray by means of a current of air which serves chiefly in the capacity of a carrier.

16. Treatment of a solution of raw phosphoric acid relatively low in free sulphuric acid content comprising, moving the raw acid toward a settling chamber, blowing relatively large quantities of air through said acid while it is moving to carry off moisture and to cool and concentrate the same, causing the precipitation of a sludge including calcium sulphate and calcium fluoride by said cooling and concentration, moving said sludge along with the moving liquid, and separating out the sludge.

17. The method of concentrating and purifying raw phosphoric acid which comprises heating the acid to a temperature short of ebullition, projecting the hot acid in a freely falling spray, evolving vapor from said spray, carrying said vapor off by a counter flow stream of air, cooling and concentrating said acid while in motion by carrying off said vapor, causing the precipitation of a sludge by said cooling and concentration, and collecting the liquid spray bearing the sludge and separating out the sludge.

18. The method of treating phosphoric acid, of relatively low free sulphuric acid content, which comprises setting the acid into motion toward a filtering chamber, and concentrating and cooling while in motion to cause the precipitation of calcium sulphate and calcium fluoride as a sludge.

19. The method of treating phosphoric acid which comprises evolving a vapor from the acid at a temperature below ebullition, blowing away the vapor and thereby carrying off fluorine.

In witness whereof, I hereunto subscribe my name this 11th day of September, 1923.

HARRY E. LA BOUR.